United States Patent [19]

Ivers et al.

[11] Patent Number: 5,004,079
[45] Date of Patent: Apr. 2, 1991

[54] SEMI-ACTIVE DAMPER VALVE MEANS AND METHOD

[75] Inventors: Douglas E. Ivers, Cary; Charles M. Nobles, Fuquay-Varina, both of N.C.

[73] Assignee: Lord Corporation, Erie, Pa.

[21] Appl. No.: 310,144

[22] Filed: Feb. 10, 1989

[51] Int. Cl.[5] .............................. F16F 9/50; F16F 9/46
[52] U.S. Cl. ..................................... 188/282; 188/319
[58] Field of Search ................... 188/299, 319, 322.22, 188/322.15, 281, 313, 318, 282; 280/707; 137/625.4

[56] References Cited

U.S. PATENT DOCUMENTS

| | | | |
|---|---|---|---|
| 2,235,488 | 3/1941 | Mercier . | |
| 3,321,210 | 5/1967 | Delchev | 280/6 |
| 3,420,341 | 1/1969 | Kaehn II . | |
| 3,807,678 | 4/1974 | Karnopp et al. . | |
| 3,826,343 | 7/1974 | Heymann | 188/282 |
| 3,995,883 | 12/1976 | Glaze | 280/707 |
| 4,034,860 | 7/1977 | Leppich | 188/282 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 X |
| 4,530,425 | 7/1985 | Veaux et al. | 188/299 |
| 4,620,619 | 11/1986 | Emura et al. | 188/319 |
| 4,635,765 | 1/1987 | Schmidt | 188/299 |
| 4,660,686 | 4/1987 | Münning et al. | 188/280 |
| 4,671,392 | 6/1987 | Wossner | 188/319 X |
| 4,696,489 | 9/1987 | Fujishiro et al. | 280/707 |
| 4,742,998 | 5/1988 | Schubert | 267/136 |
| 4,743,000 | 5/1988 | Karnopp | 267/218 |
| 4,756,549 | 7/1988 | Kurosawa et al. | 280/707 |
| 4,786,034 | 11/1988 | Heess et al. | 267/64.15 |
| 4,821,849 | 4/1989 | Miller | 188/280 |
| 4,850,461 | 7/1989 | Rubel | 188/319 |
| 4,854,429 | 8/1989 | Casey | 188/319 X |

FOREIGN PATENT DOCUMENTS

| | | | |
|---|---|---|---|
| 0838403 | 5/1962 | Fed. Rep. of Germany | 108/280 |
| 1336186 | 7/1963 | France . | |
| 1188453 | 4/1970 | France | 188/318 |
| 2164120 | 3/1986 | United Kingdom . | |

OTHER PUBLICATIONS

Crosby et al., Vibration Control using Semi-Active Force Generators, Transaction of the ASME Paper No. 73-DET-122.
Margolis et al., Heave Mode Dynamics of a Tracked Air Cushion Vehicle with Semiactive Airbag Secondary Suspension, Journal of Dynamic Systems Measurement and Control, Dec. 1975, pp. 399-407.
Margolis, Semi-Active Control of Wheel Hop in Ground Vehicles, Vehicle System Dynamics, 1983, pp. 317-330.
Krasnicki, The Experimental Performance of an "On-Off" Active Damper, Lord Corporation Technical Article, Circa 1981.
Hrovat et al., An Experiemental Comparison Between Semiactive and Passive Suspensions for Air-Cushion Vehicles, Int. J. of Vehicle Design, 1981.
Lord Corporation Semi-Active Suspensions, Lord Corporation Technical Article.
Margolis, The Chatter of Semi-Active On-Off Suspensions and its Cure, Vehicle System Dynamics, vol. 13, 1984, pp. 129-144.

Primary Examiner—Robert J. Oberleitner

[57] ABSTRACT

An improved method and means for control and accomplishment of semi-damper assembly transition between high damping and low damping states is provided which takes advantage of the available inherent dynamic fluid pressure forces produced by the condition of motion between supported and supporting members. Deferral or delay of damper state transitions to avoid force discontinuities or system noise is accomplished mechanically, or automatically internal to the structure of the adjustable valve assembly. A voice coil actuated valve slider is operable within the piston of the damper assembly to modulate the damping coefficient in conjunction with check valves. The delay of damper state transition from high to low damping is accomplished independent of the particular control policy utilized until the fluid pressure differential across the valve slide is a preselected low value. Commanded valve switching and motion condition sensing requirements are also minimized by the reversible check valves. Damper state transitions normally required based on a sign change in relative velocity are accomplished without commanded slider movement by the check which are fluid pressure actuated according to the direction of fluid flow through the damper.

24 Claims, 6 Drawing Sheets

SEMI-ACTIVE DAMPER VALVE MEANS AND METHOD

FIELD OF THE INVENTION

The invention relates generally to fluid damper assemblies used in vehicle suspensions and other mounting systems for attenuation of shock and vibratory forces between relatively movable members, interconnected by semi-active damper means rapidly switchable in accordance with a preselected control policy between high damping and low damping states, wherein the damping coefficient of the damper means is respectively relatively high and relatively low. More specifically, the invention relates to an improved method and means for the control and accomplishment of damper means transition between high damping and low damping states which takes advantage of the available inherent dynamic fluid pressure forces of the system, to minimize control signal conditioning requirements and substantially reduce undesirable shock impulses or noise which at times may be generated by switching of the semi-active damper between damping states.

BACKGROUND OF THE INVENTION

The design and construction of vibration isolators, absorbers, and damping treatments has led to important advancements in vehicle suspension technology and other applied fields. Traditionally, vibration control is achieved using passive elements such as springs, dampers and masses in the form of metallic, pneumatic, hydraulic or rubber devices. These elements are considered "passive" in the sense that no power source is required for their effective operation, i.e., the vibration control elements only store or dissipate the energy associated with the vibratory motion. As a practical matter, numerous vibration problems can be solved using inexpensive, reliable passive devices; however, distinct performance limitations are inherent when only passive devices are used, which may be unacceptable for more sophisticated applications. Attempts at improving these vibration control devices have included the provision of adjustable parameters which could be varied to suit changing excitation or response characteristics of the particular system. For example, automobiles have utilized manually adjustable shock absorbers. More recently, modern vehicle suspensions and isolation systems have incorporated more elaborate devices such as automatic leveling systems to adjust static deflection as the suspension load varies. However, the most notable shortcoming of any such passive device is that in addition to failing to provide sufficient damping force during certain instances of dynamic response, damping forces may at other times tend to amplify, rather than attenuate the transmission of energy to produce an undesirable effect.

Fully active dampers or systems have been created which utilize high pressure pumps, high performance mechanisms or other external energy source to vary vibration control system parameters. With the advent of optimization in control theory and development of an understanding of the dynamics of such systems using these devices, fully active systems have been constructed for a wide variety of applications which include vehicle suspensions, helicopter rotor isolation, flexible aerospace vehicle bending mode control and the isolation of pilots from aircraft motion. Although fully active vibration control systems can achieve excellent performance, their expense, complexity, bulk and unreliability may have, in many instances, made them commercially unsuitable for many applications.

Semi-active systems have been created in which much of active system performance gains are realized without the attendant complexity, cost and external power or drive requirements, which are further clearly superior to previous adjustable or static passive systems. Semi-active dampers utilize no hydraulic pump or large external drive means, yet in contrast to purely passive systems, are rapidly switchable between damping states to vary the damping coefficient. According to the particular control policy utilized to drive a semi-active damper, attenuation of the transmission of energy between movable members can be achieved which approaches that realized in fully active systems. Semi-active dampers, and in some instances control policies for them, are disclosed in U.S. Pat. Nos. 3,807,678; 3,995,883; 4,468,050; 4,468,739; 4,491,207; 4,696,489 and 4,742,998; and also in U.S. patent application Ser. Nos. 913,067 filed Sept. 29, 1986, and 945,380 filed Dec. 22, 1986, both owned by the assignee of the present application.

In certain applications, operation of real time semi-active damping systems which produce relatively abrupt changes in damping coefficient under normal working conditions can result in the generation of undesirable impulses or shock forces that lead to unwanted system noise or transient phenomena. This shock or noise generation problem may, in certain instances, be eliminated by reducing the differential between the damping coefficient high and low states, but this may degrade performance of the damper to an unexceptable extent. Other possible solutions include electronically conditioning the control signals imparted to the flow-controlling valve means of the damper to cause it to operate more slowly or to delay its effecting switching of the damper states until the relative velocity across the damper is at a selected low value, or until the force across the damper is at a selected low value, etc. However, for the operation of semi-active damping systems in certain environments, more reliable and cost effective performance is better achieved by decreasing rather than increasing reliance upon electronic system monitoring or control devices.

Another characteristic of semi-active systems, especially in vehicle applications, is the repeated, rapid transition of the actuated valving elements required to appropriately modulate the damping coefficient. In such cases, damper switching takes place to a large degree based on changes in the sign of the relative velocity between vehicle body and frame components. For control policies based at least in part upon this relative velocity parameter, commanded valve switches due to a relative velocity sign change are necessitated with a much higher degree of frequency than valve switches dependent upon other system motion conditions. In addition to system fatigue and wear which can be associated with the valve elements laboring under multiple switching commands, motion sensing and signal conditioning requirements for these control policies or modifications to them can augment the cost and unreliability of such systems.

It is accordingly an object of the present invention to provide a semi-active damper means which eliminates or substantially minimizes the above mentioned and other problems and limitations typically associated with semi-active devices of conventional construction and operation.

SUMMARY OF THE INVENTION

With the foregoing in mind, the present invention provides a method and means for the control and accomplishment of damping coefficient modulation in a semi-active damper which is implemented automatically and internally to the valve means structure. The improved valve means effectively reduces motion condition sensing and signal processing requirements, while also minimizing component fatigue and wear which can be associated with repeated switching. Damping state transitions that are required based on a sign change in relative velocity between the supported and supporting members are effected automatically by check valve means of the invention without the need for an electromagnetically actuated valve switch. Further, undesirable noise and/or shock forces which can be experienced by the system and are usually produced by force discontinuities or abrupt changes in damping state at relatively high relative velocities between the movable members are eliminated or substantially reduced. Dynamic fluid pressure forces within the valve inherently produced by system motion are utilized to defer or delay switching of the valve means from the high damping state to the low damping state, even against a commanded valve actuation, until the relative velocity between the members is at a preselected low value. In this manner, the damping state transition is delayed to assuage the abrupt force discontinuities which might otherwise adversely affect system performance.

In carrying out principles of the present invention, in accordance with an embodiment thereof, an adjustable valve means is provided within the piston of a damper assembly interconnecting supported and supporting members. The supported and supporting members may, for example, be the body and frame components of a vehicle such that the primary function of the system would customarily be to isolate the supported member insofar as possible from vibration and shock forces transmitted thereto. The system is semi-active and may be operated pursuant to any suitable control policy for regulating or modulating the damping coefficient of the damper means. The valve means includes an electromagnetically actuated voice coil slider operable between first and second positions to obstruct or permit fluid flow through the piston to modulate the damping coefficient. Electrical current traveling through the voice coil as commanded by control means of the system determines the direction of slider force and hence, to the extent described, the position of the valve slider and selected damping coefficient.

The efficiency of this system is greatly improved by two check valves cooperable with the valve slider which are operable to effect a damping state transition, without command-actuated movement of the slider, upon a change in direction of the relative velocity between the movable members. The check valves are fluid pressure biased, and in cooperation with the slider, check fluid flow in one direction to produce high damping, and permit fluid flow in the opposite direction to effect low damping. When the slider position is changed, the described check valve function is reversed.

The deferral or delay of valve switching from high damping to low damping is provided by fluid pressure control surfaces of the slider. Dynamic fluid flow forces acting on the control surfaces function to maintain the valve slider in its then high damping state position, even against a commanded actuation to the contrary, until the fluid pressure differential across the valve means is at a selected low value. The result is that damper state transition is deferred or delayed until the transmitted force across the semi-active damper is at a selected low value.

Additional embodiments of the valve means are provided and also configured to serve the functions just discussed. The modified valve arrangements afford improved dynamic fluid interaction with the moving components of the valve to allow for simplified, reliable operation with increased sensitivity to changes in fluid pressure. To this end, the check valve means may be embodied as a single floating disc member. A fluid pressure relief function may be furnished by the compliant nature of the check valve ring to protect the system against unusually extreme impulses or loads. In this manner, the check valve ring may also effect an on-state damping curve of preselected, non-linear design, thereby "tuning" the damping for better isolation than what could be obtained with linear damping.

BRIEF DESCRIPTION OF THE DRAWINGS

For a better understanding of the invention, reference may be made to the following description of exemplary embodiments, taken in conjunction with the figures of the accompanying drawings, in which.

damping of conventional dampers and that of the present invention.

DESCRIPTION OF THE PREFERRED EMBODIMENTS

Figure 1:
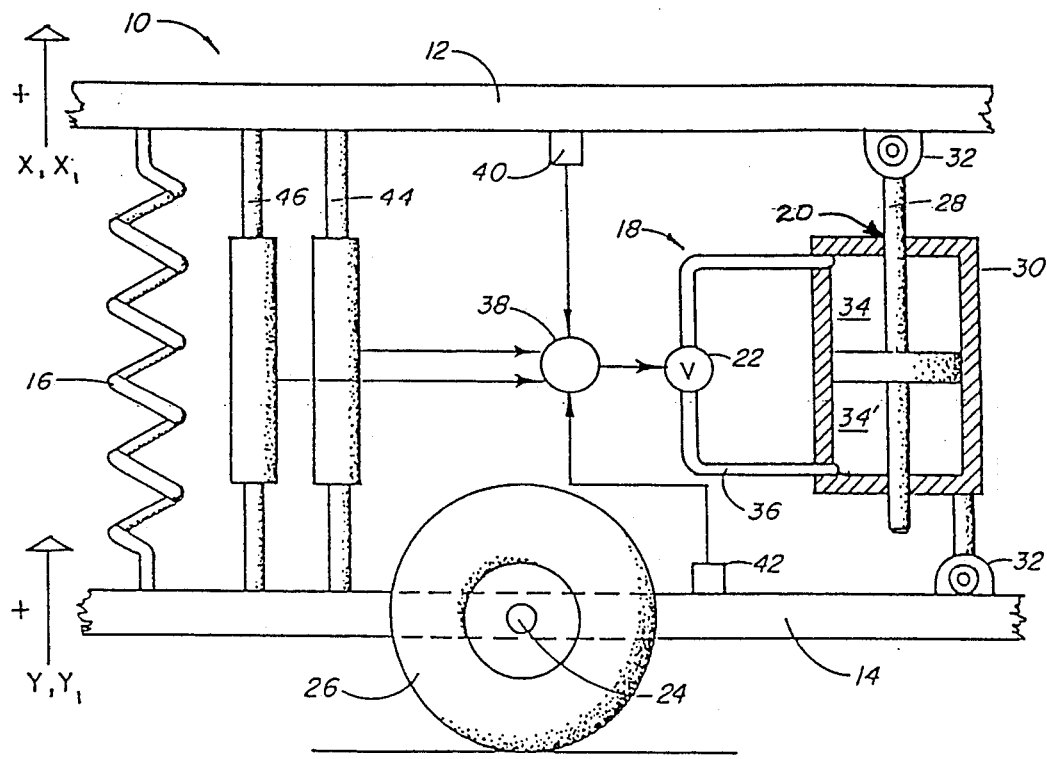
FIG. 1 is a schematic view of a force attenuating suspension or similar mounting system having semi-active damper means controllable in accordance with and suitable for practice of the invention.

Referring now to FIG. 1, there is depicted a two degree of freedom, suspension or similar force-attenuating system 10 for interconnecting vertically spaced and relatively movable supported and supporting members 12 and 14, respectively. It is contemplated that members 12 and 14, for exemplary purposes, may be the body and frame components of an automobile or other vehicle (not shown) such that the primary function of system 10 would customarily be to isolate supported member 12 insofar as possible from the vibratory and/or shock forces transmitted to member 14 by road surface irregularities, engine firing disturbances and other force impulses. For purposes of describing the motion condition of system 10, designations X, $X_1$ respectively define the vertical displacement and the absolute velocity of supported member 12, it being arbitrarily indicated that these are positive when in an upward direction and thus are negative when in a downward direction. The same sign convention and the letters Y, $Y_1$ similarly designate the vertical displacement and absolute velocity of supporting member 14. It is understood that when system 10 is at rest, X, $X_1$, Y and $Y_1$ are all zero.

The supported and supporting members 12 and 14 of system 10 are interconnected by compression spring means 16 and semi-active damper means 18. As shown schematically in FIG. 1, semi-active damper means 18 includes a damper assembly 20 of the hydraulic piston and cylinder type, in which the damping coefficient is variably controlled by fluid circuitry that includes an adjustable valve means 22 and is subsequently described in detail. Supporting member 14 for moving vehicle applications may also be connected to an axle 24 and tire 26. While only a single spring/damper set is shown, a plurality may be, and normally is, provided in the typical vehicle suspension system. Damper assembly 20 is illustratively of the hydraulic piston and cylinder type, such that the rod 28 and cylinder 30 are secured to respective ones of the supported and supporting members 12, 14 by suitable connectors 32. Relative vertical movement between members 12 and 14 displaces hydraulic fluid between variable volume chambers 34 and 34' of damper 20 via the electronically or otherwise rapidly adjustable valve means forming part of a hydraulic circuit 36 interconnecting such chambers. As will be discussed, valve means 22 and thus hydraulic circuit 36 are preferably incorporated within the piston head separating chambers 34 and 34'.

Adjustable valve means 22 is rapidly switchable between at least two different operating positions or conditions. In one of these operating conditions to be designated as "high" damping, valve means 22 significantly throttles or restricts the flow of hydraulic fluid through fluid circuit 36. This causes the damping coefficient of the semi-active damper means 18 to be relatively large. In the other one of its operating positions or conditions, valve means 22 permits relatively free flow of hydraulic fluid through hydraulic circuit 36 and thus between cylinder chambers 34 and 34'. At such times, designated as "low" damping, the damping coefficient of semi-active damper means 18 is at a preselected relatively small magnitude, which may even approach an approximation of zero damping, according to the particular system requirements.

Switching of valve means 22 between high and low conditions, and therefore the switching of semi-active damper means 18 between relatively high and low damping states, is normally produced by suitable electronic control means 38 operable responsive to a preprogrammed control policy and to input data received from preselected ones of a plurality of motion sensors 40, 42, 44 and 46. As will be subsequently described in detail, operation of semi-active damper means 18 between high damping and low damping states may also be assisted or accomplished by mechanical valve arrangements in addition to electronic control means 38. Sensors 40 and 42 respectively detect accelerations of supported and supporting members 12 and 14, which acceleration signals can be utilized by such sensors and/or by control means 38 to derive displacement, absolute velocity and/or relatively velocity data. Sensors 44, 46 directly detect relative displacements and relative velocities of members 12, 14. It will be appreciated that not all of the illustrated sensors need be employed or provided in association with system 10. It may, in some instances, further be determined inefficient to derive all of the necessary data for input to control means 38, in which case mechanical means incorporated within adjustable valve means 22 may be utilized to obviate signal conditioning input pertaining to relative displacement changes or relative velocity between the supported and supporting members 12 and 14.

Proscribed semi-active damper performance of assembly 20 may be implemented by any appropriate semi-active damper control policy through control means 38. For purposes of illustration, one "standard" control policy, which is disclosed in U.S. Pat. Nos. 3,807,678, 4,491,207 and 4,696,489, is based upon the sign of the product of the relative velocity between the supported and supporting members times the absolute velocity of the supported member. More specifically, the aforesaid control policy dictates that the state of the semi-active damper be high when $X_1(X_1-Y_1)>0$, i.e., when the sign of the aforesaid product is positive or plus; and that the damper's damping state be low when $X_1(X_1-Y_1)<0$, i.e., when the product sign is negative. In its implementation of this control policy, control means 38 may obtain the necessary data with respect to relative velocity from selected ones of sensors 40, 42, 44, 46, or the need for such relative velocity data may be minimized or eliminated altogether, as will be discussed. Other control policies may be utilized as well as, for example, those which operate dependent upon the sign of the product of the relative velocity of the supported and supporting members times the relative displacement of such members. For purposes of the invention, it is not deemed relevant what particular control policy is utilized, provided that for discussion purposes selecting the damper state is dependent at least in part upon the relative velocity between the supported and supporting members.

One problem which can be associated with operation of semi-active damper assembly 20 when assembly is rapidly and repeatedly switched between high damping and low damping states is the generation of force impulses or shock forces which may, in certain utilizations of assembly 10, create stresses and/or noise of objectionable magnitude. These characteristics may be apparent when the damper assembly is operated, for example, under the standard control policy previously discussed in which switching of the damper assembly from one to the other of its damping states is effected substantially immediately, i.e., without any intentional delay, whenever the control policy dictates that a change in the damping state of the damper means should be made.

Figure 2:
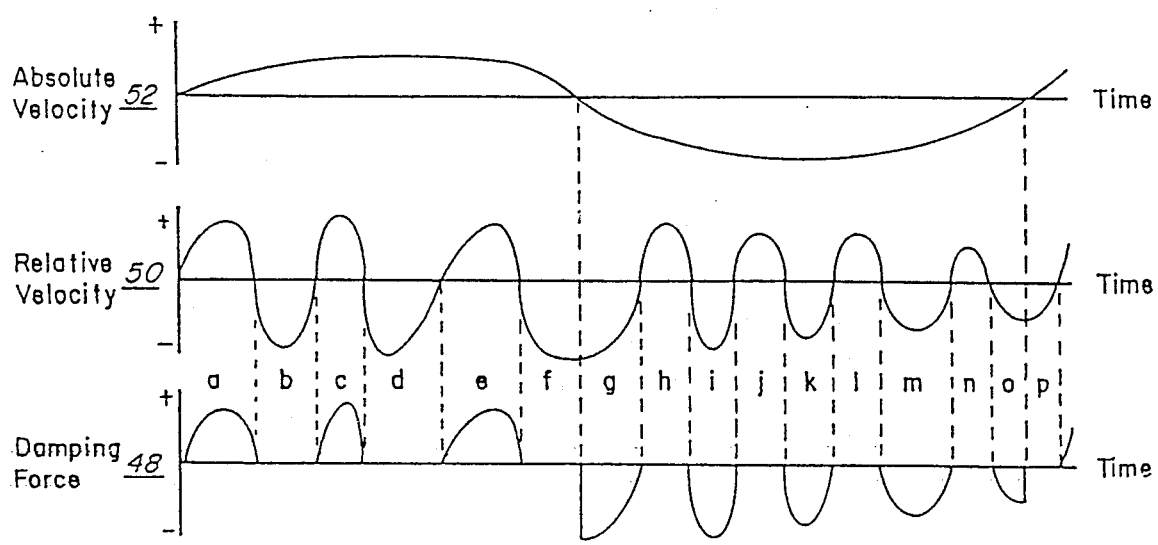
FIG. 2 is a simplified graphic illustration of the relationship between velocities and damper forces of a semi-active damper means controlled in a conventional fashion in accordance with a known control policy.

This phenomenon can be explained with reference to FIG. 2, which depicts a simplified representation of damping forces 48 such as might typically be produced by the damping means 18 under differing conditions of the relative velocity 50 of members 12, 14 and the absolute velocity 52 of supported member 12, when the damper means is controlled in accordance with the above mentioned standard control policy based upon the sign of the product of the aforesaid velocities. As indicated in FIG. 2, the sign of the relative velocity 50 of members 12, 14 may change much more frequently than the sign of the absolute velocity 52 of member 12, particularly in the case of a vehicular suspension system. The magnitude of the damping force 48 at any given time is a function of the then existing relative velocity 50, the then existing adjusted on/off state of the adjustable valve means 22, and the preselected damping coefficient possessed by the damper when in such state. In accordance with the exemplary standard control policy, and as depicted by the lowermost plot of FIG. 2, during those time intervals B, D, F, H, J, L, N and P, when the product of the relative velocity 50 and absolute velocity 52 is less than zero, i.e., negative or minus, semi-active damper means 18 is caused to be in its low damping state and thus the damping forces 48 are of a preselected low magnitude. The preselected low magnitude may be approximately zero, as illustrated. On the other hand, during those time intervals A, C, E, G, I, K, M and O, when the product of the relative and absolute velocities 50, 52 is greater than zero, i.e., positive or plus, damper means 18 is caused to occupy its high damping state such that it produces significant damping forces 48 that are proportional to the relative velocity 50. Except for time intervals G and O, all of the above mentioned time intervals begin and end when the relative velocity 50 is zero. As a consequence, the damping forces 48 generated within such time intervals have few, if any, discontinuities or abrupt variations. However, in the two time intervals G and O wherein changes in the damping state of damper means 18 result from changes in the sign of absolute velocity 52 rather than from the sign changes of relative velocity 50, abrupt changes in the damping force may and illustratively do occur. As seen in the case of damping force 48 generated at the outset of time interval G, when the control policy dictates that the damper state be switched from low to high due to the change in the sign of the absolute velocity 52 from positive to negative, the relative velocity 50 may then be and is illustratively quite large. Since the magnitude of the damping force 48 is a function of the relative velocity 50, an abrupt and large increase in the damping force 48 occurs at the outset of time interval G. Similarly, at the end of time interval O, when the standard control policy dictates a change in the damping state from high to low due to another change in sign of the absolute velocity 52, damping force 48 undergoes another abrupt change, which illustratively is a sharp decrease. Either or both of these abrupt changes or discontinuities in the damping force 48 may contribute to or produce shock and/or noise of undesirable magnitude in the system 10 with which damper means 18 is associated.

Figure 3:
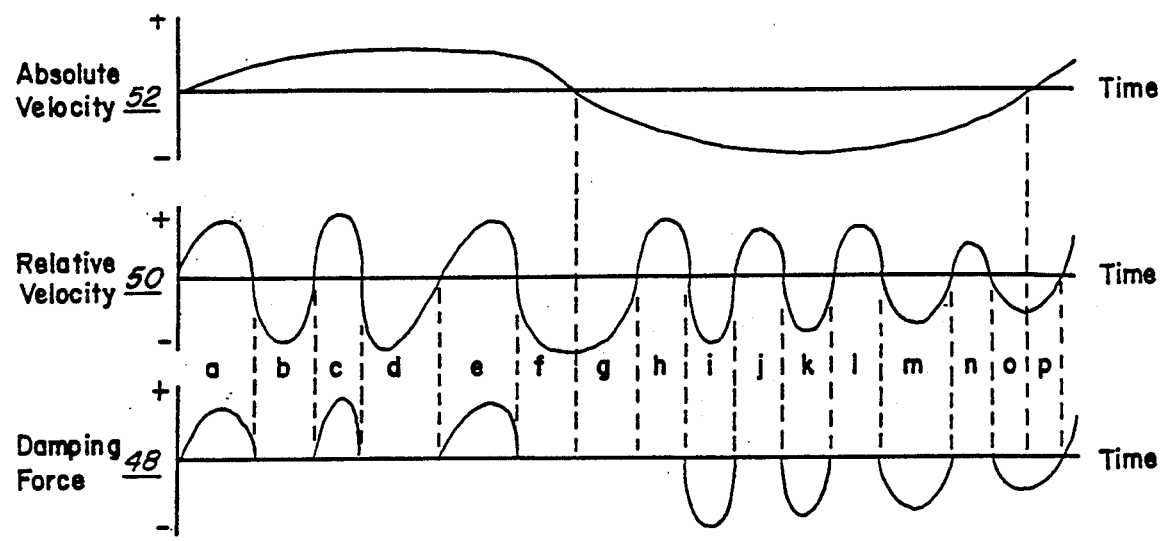
FIG. 3 is a graphic illustration similar to FIG. 2 showing the changed damper forces that ensue when switching of the damper means between its high and low damping states is delayed in accordance with a preferred method of operation and accomplished with the present invention.

The aforesaid damping force discontinuities as depicted in FIG. 3 may be eliminated by delaying state changes of damper means 18 until the relative velocity 50 is equal to or less than a preselected low magnitude. This low magnitude may be approximately zero. The result is to eliminate abrupt damper force increase and decrease respectively shown previously in FIG. 2 in the time intervals G and O. More specifically, such a "delay" in damper switching as described eliminates substantially all damping force in time interval G, and causes "high" damping force commenced at the outset of time interval O to continue (rather than abruptly switch to "low" damping) into and through interval P.

In some instances, adequate shock and noise reduction may be achieved by delaying or deferring only some, rather than all, state changes of damper means 18 until the relative velocity 50 is no greater than the preselected low magnitude. For instance, it may suffice for damper state changes to be delayed only when the change is from the high damping state to the low damping state, or from the low damping state to the high damping state. For example, it has been ascertained that in some applications, the objectionable force impulses or "thumping noise" generated in automobile suspension systems employing semi-active damper means in accordance with a control policy dependent at least in part upon the sign of relative velocity, may be greatly reduced by delaying, until the relative velocity across the damper is of a preselected low or zero magnitude, only those damper states changes from high damping to low damping. Delay of damper state changes from low damping to high damping are believed, in certain applications, to have less significant or noticeable effect upon the noise generation problem.

For example, investigation of the problem of noise generation caused by force impulses in a conventional vehicle suspension system such as that shown schematically in FIG. 1 and which includes a resilient deformable tire member 26, indicates that especially in rigid vehicle structures the problem is noticeably affected by the condition of the resilient tire or other energy storing or releasing compliances in series with the damper. Objectionable noise is likely to ensue when a change in the state of the damper from high to low occurs at a time when the magnitude of the tires' (or other compliant members such as bushings, etc.) compressive deformation, and thus stored energy, is of substantial magnitude. For the purpose of clarification, it is understood that suspension deflection or spring forces in parallel with the damper do not precipitate this problem. When in its high damping state, damper means 18 transmits much of the load force of supported suspension member 12 to supporting member 14. This load force, as well as that of member 14, is transmitted via axle 24 to tire 26, as a result of which the tire compressively deforms and stores energy. Change in its damping state from high to low substantially decouples damper means 18, and thus supported suspension member 12, from member 14. Consequently, the tire undergoes rapid return movement toward an undeformed condition and abruptly transmits a substantial portion of its stored energy via axle 24 to member 12. This causes "bouncing" or oscillation of the vehicle components and accompanying generation of objectionable thumping noise.

As previously noted, one approach to the described problem is to defer switching of damper means 18 from one to the other of its damping states, or at least from its high damping state to its low damping state, until the relative velocity across the damper is no greater than approximately zero or some other preselected low magnitude. Another approach is to defer switching of damper means 18 until the magnitude of the deformation and thus the stored energy of tire 26, and/or of some other deformable energy storing member or members within the system, is no greater than some preselected low magnitude. In the case of tire 26, this can be determined by monitoring the vertical displacement of member 14, either by use of data derived from that produced by acceleration sensor 40 or by use of some other type of sensor (not shown) capable of more directly ascertaining the magnitude of the deformation and/or the stored energy of tire 26.

It is apparent from the above that modifications to the timing and applications of damping force 48 by delay or deferral of switching of damper means 18 until one or both of the above conditions are met so as to reduce force impulse or unloading of compliances can be achieved by modifications to the described standard control policy, or other particular control policy of choice. Input of data from a variety of system motion condition sensors and/or signal processing techniques can be utilized to vary the preselected control policy as executed by control means 38. Methods for the modification of control policies to achieve the desired performance are described in co-pending applications owned by the assignee of record herein.

While the modification of the damping force 48 as described will to some extent degrade the performance of the system because in some instances it may reduce the maximum isolation the system can achieve or, for example, reduce the performance of a vehicle in handling maneuvers, there are factors that lessen such effect. Firstly, no delay of damper switching occurs to alter the performance of damper means 18 at those times when the dictated change in damper state is predicated upon change in sign of the relative velocity 50, rather than a change in sign of absolute 52. As indicated in FIGS. 2 and 3, the relative velocity sign changes are customarily more frequent than absolute velocity sign changes. Further, the time period during which a damper state change is delayed is normally relatively brief; for example, in automobile suspension systems operating under normal conditions, the delay could be expected to be for only 25-50 milliseconds.

As an alternative to a "controls" approach, the above described deferral of damper state transitions to avoid force discontinuities and attendant shock impulses or noise may be accomplished mechanically or "automatically" internal to the structure of adjustable valve means 22. Instead of providing additional sensors to gather system data indicative of relative velocity, energy stored in compliances, vertical displacements and/or additional acceleration signals, which can then be processed or utilized to implement a complex modified control policy, the delay or actuation of damper state changes can be accomplished in conjunction with a standard or simplified control policy with an adjustable valve means 22 of the present invention controlled in part by the fluid pressure differential between variable volume chambers 34 and 34'. The inherent dynamic fluid pressure forces acting on the valve elements can be utilized to delay or defer actuated switching from the high to low damping state, even when commanded to do so by the particular control policy, until the fluid pressure differential between the chambers is at a selected low value. Since the fluid pressure differential is a function of the relative velocity, the result is the elimination of undesirable force discontinuities or noise normally caused by control commanded damper switching at times other than relative velocity zero crossings. It has been noted that at such times as when the relative velocity between the supported and supporting members 12, 14 is relatively low or zero, the fluid pressure differential between chambers 34 and 34' is also relatively low or close to zero.

The adjustable valve means of the present invention may also eliminate the need for motion sensing and signal conditioning normally required to effect a damper state transition based on a sign change in relative velocity. As described below, the reversible check valves of the valve means are operable pursuant to dynamic fluid pressure forces inherent in the system and serve to accomplish damper state transition from a high to low and low to high damping coefficient upon change in direction of hydraulic fluid flow through the damper. Thus, damper state transitions automatically occur upon change in direction or sign of the relative velocity between members 12, 14 at times when the relative velocity is at or near zero, without an external control policy command or electronic valve actuation. In this manner, the automatic dynamic fluid pressure controlled adjustable valve means can eliminate the need for relative velocity sensing to automatically implement damping state transitions at relative velocity sign changes or zero crossings, without a control actuated electromagnetic valve slider movement. This further results in reduced actuation requirements and reduced wear on the valve parts (by a factor of 10 in some applications).

Figure 4:
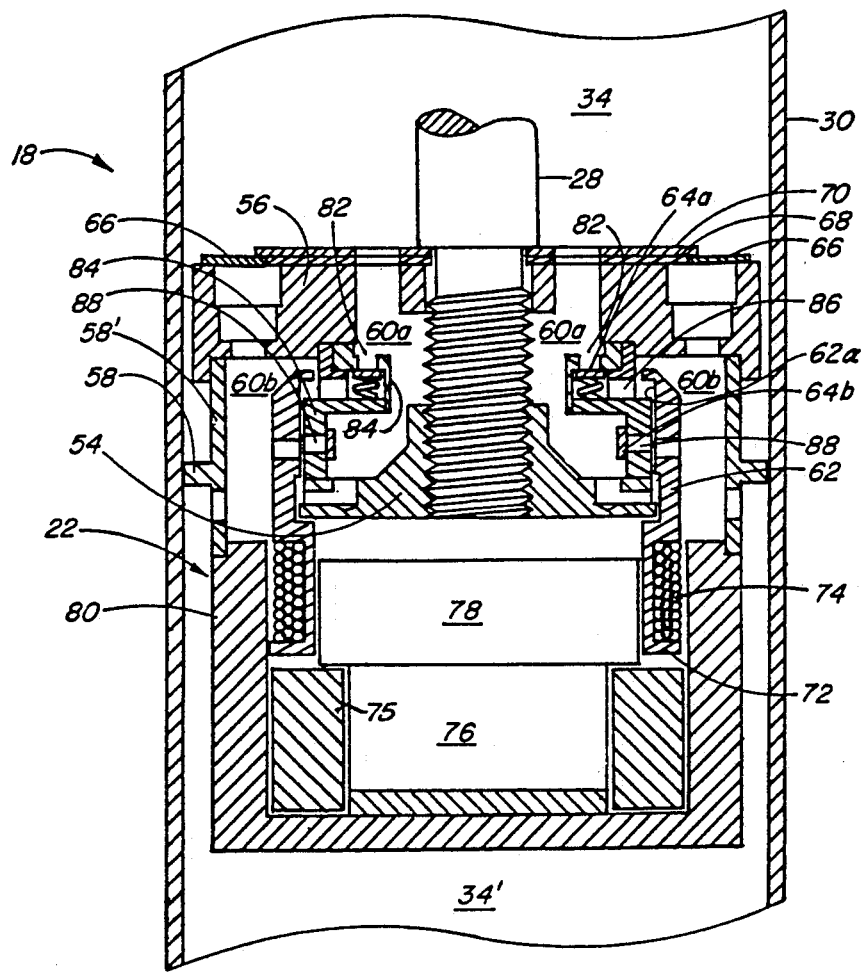
FIG. 4 is a fragmented, partially cross-sectional view of the present invention showing an embodiment of the adjustable valve means.

Referring now to FIG. 4, the adjustable valve means 22 and other fluid circuitry of the present damper assembly is associated with a piston operable in extension and compression via rod 28 between variable volume chambers 34 and 34' of damper 18. Rod 28 is threadingly engaged with the piston core 54 and likewise is connected with one of the supported or supporting members 12, 14 of FIG. 1. The outer wall 58 of the piston is dimensioned to adequately allow for movement within cylinder 30 and may further include within recessed area 58' a resilient fluid seal (not shown) to prevent undesirable leakage between the variable volume chambers. Cylinder 30 is connected mechanically to the other of members 12, 14. The hydraulic flow circuit 36 schematically represented in FIG. 1 may be and illustratively is disposed within the piston of the damper means as shown in FIGS. 4-9, subsequently discussed in detail. As depicted in FIG. 4, a plurality of main flow ports 60a and 60b are provided respectively, for example, radially through upper manifold 56 and between core 54 and outer piston wall 58. Communication of fluid therethrough between chambers 34 and 34' is determined by the position of valve slider 62 and oppositely operating check valves 64a and 64b. Predesigned high state damping curves and overload protection for fluid release or transport between the chambers under unusually harsh pressure conditions may be provided by pressure relief rings 66. A locating ring 68 orients the pressure relief ring 66 coaxially with upper manifold 56, while valve retainer 70 holds it in place.

The valve slider 62 is rapidly movable parallel to the central axis of the damper assembly between first and second positions responsive to electrical signals produced by control means 38 (FIG. 1). The drive means for producing slider movement includes a voice coil portion 72 which is reciprocable within a permanent magnetic field. Electrical current traveling through coil winding 74 of voice coil 72 interacts with the magnetic field producing a force tending to cause resultant movement of the slider 62. The direction of slider force and hence movement thereof is determined by the direction of electrical current through coil winding 74. It is contemplated that slider 62 may also be spring biased in one direction against the electromagnetically produced slider force, such that when no current is applied, the slider will tend to be biased to one of its extreme positions. The necessary electrical current for actuation of voice coil 72 may be provided by electrical wiring (not shown) extending through a longitudinal bore (not shown) of rod 28 and connected to control means 38. The magnetic field through which voice coil 72 passes during reciprocal movement of slider 62 is established by a magnetic assembly which includes permanent magnets 75 radially spaced about the interior of a magnetic conducting cup 76 (FIG. 4). A head portion 78 operates as a magnetic conductor to create a magnetic field in close proximity to coil windings 74 along the full path of slider travel between the first and second positions. The magnetic components are retained within cup member 80 forming a portion of the piston. The magnetic field produced is of sufficient strength to generate the necessary slider forces under all working conditions and yet the magnetic assembly is sufficiently compact in construction for service in a piston head of conventional dimensions.

The efficiency of valve means switching between high damping and low damping states is greatly improved by the cooperation of valve slider 62 with reversible check valves 64a and 64b (FIG. 4). Usually, valve slider actuators must rapidly and repeatedly switch between first and second positions every time it is desired to vary the damping coefficient of the damper inbetween its high and low states. Using a standard semi-active control policy for purposes of illustration, switching between the two damping states is based upon the sign (positive or negative) of the absolute velocity of the supported member and the sign of the relative velocity between the supported and supporting members 12, 14. Data indicative of these parameters are input to the control means 38 (FIG. 1), which then direct electronic valve switching commands to the voice coil 72 of valve means 22. Measurements of relative velocity may be accomplished by any number of sensors including those shown as numerals 40-46 in FIG. 1, and may be configured as, for example, linear velocity transducers, accelerometers, etc. As previously mentioned, vehicle suspension motion caused by road input disturbances typically is characterized by a high frequency bandwidth of sign changes in relative velocity across the damper relative to the frequency bandwidth of sign changes in absolute velocity of the sprung mass. For this reason, a standard semi-active damper control policy which modulates the damping coefficient based on the product of the aforementioned absolute and relative velocities, as well as any other control policy which is at least in part dependent upon relative velocity, necessitates a much greater frequency of command signals (and hence actuated changes in valve position) based on the numerous system relative velocity sign changes, than frequency of switching commands which are dictated by a sign change in the absolute velocity of the supported member 12. In order to reduce the frequency of actuated transitions of valve slider 62 between on and off positions, check valves 64a and 64b are provided. They permit those transitions between high damping and low damping states that are necessary due to a sign change in relative velocity to be accomplished internal to valve means 22, without the need for any external sensing of the relative velocity across the damper or external command signal and slider actuation.

Figure 5A:
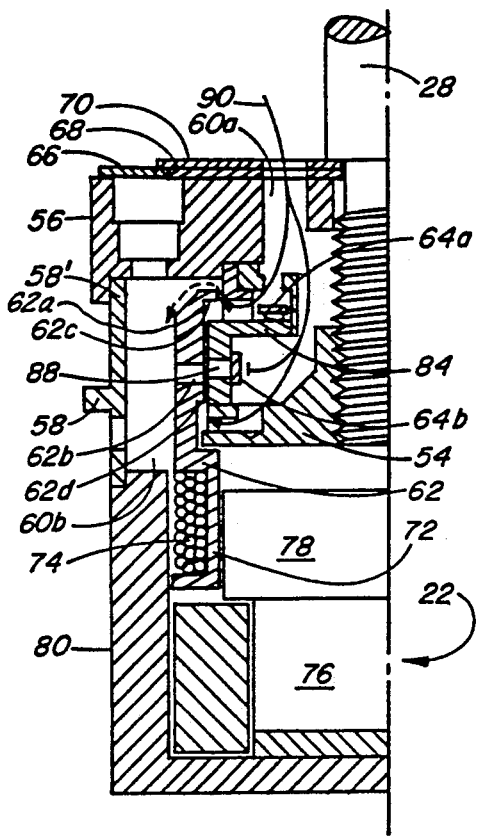
FIGS. 5a–5d are fragmented, somewhat schematic radial half-section views of the adjustable valve means of FIG. 4, showing check valve and slider functions during extension and compression conditions of motion.
Figure 5B:
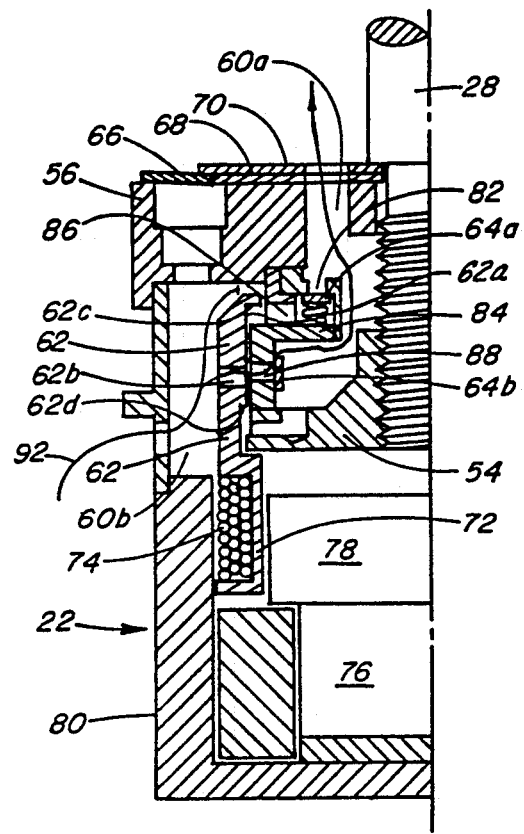
Figure 5C:
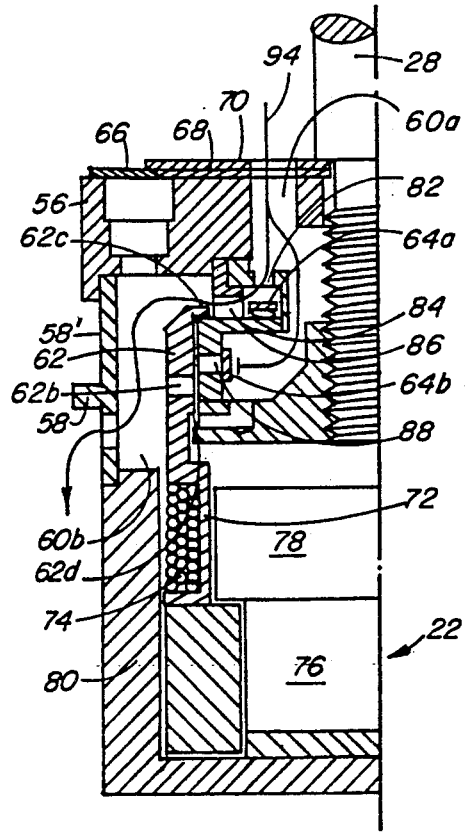

As shown in FIGS. 4 and 5(a)-5(d), check valve 64a is a moving disc, one-way check valve which is spring biased to its normally closed FIG. 4 position against a plurality of radial openings or ports 82 of an inner manifold 84. The one-way valving action of check valve 64a will permit the flow of hydraulic fluid from the upper chamber 34 through main flow ports 60a and ports 82 into passageways 86. Depending upon the position of slider 62, hydraulic fluid flow may be permitted through flow ports 60b and into the lower chamber 34'. Flow of hydraulic fluid in the opposite direction, e.g. during compression of the damper assembly, through ports 82 and passageways 86 is obstructed by the one-way valve action of check valve 64a. During such times as flow is permitted past check valve 64a during extension, fluid flow is obstructed from passage into main flow port 60b through passageway 88 by check valve 64b (FIG. 5c). Check valve 64b permits hydraulic fluid flow in the opposite direction such that during compression (FIG. 5b), fluid flow will be permitted from the lower volume chamber 34', through main flow port 60b, passageway 88 and flow ports 60a into variable volume chamber 34 (provided the valve slider 78 is in the "on" position). Check valve 64b as shown in the embodiment of FIGS. 4 and 5(a-d) is of the resilient split ring type. Other check ring hardware arrangements for reversible check valve 64a and 64b will be apparent to those skilled in the art.

The enhanced functionality of valve means 22, insofar as it relates to the reduction of the number of valve slider position transitions and/or to effectively reduce force discontinuities or noise by the delay of valve slider transition until a time in which the pressure differential between variable volume chambers 34 and 34' is at a preselected low magnitude, will be explained with reference to FIGS. 5(a-d).

In FIG. 5(a), system 10 (from FIG. 1) is moving in extension, such that the supported and supporting members 12, 14 are moving away from one another, so that hydraulic fluid will have a tendency to flow from the upper variable volume chamber 34 to lower chamber 34', in the manner conceptually designated by flow lines 90. With the valve slider 62 shown in FIG. 5(a) in the first position, during extension valve means 22 is operating in the high damping state since hydraulic fluid is substantially obstructed in flowing from upper chamber 34 to lower chamber 34'. The inner surface of the valve slider prevents fluid flow from passageway 86 to the main flow ports 60b, except for a preselected small amount of leakage. Check valve 64b also prevents fluid flow from main flow port 60a through passageway 88 which, when slider 62 is in the first position, is in alignment with radial ports 62b located intermediate the length of slider 62. The previously discussed delay in damper switching from the high damping state to the low damping state in order to prevent force discontinuities, or the abrupt unloading of compliances which may at times result in force discontinuities and attendant shock impulses and/or noise described with reference to FIGS. 2 and 3, is accomplished by shoulder-like flow control surfaces or areas 62c and 62d of the slider. Delay of slider 62 movement from its first position to its second position and thus delay of a change from high to low damping is automatically accomplished internal to valve means 22, such that even if slider actuation is commanded to the second position by control means 38, the dynamic fluid pressure forces as schematically indicated by lines 90 impacting on control surfaces 62c and 62d will tend to retain slider 62 in its first position, even against the force created in the opposite direction by voice coil 72. Only when the fluid presure differential between variable volume chambers 34 and 34' is sufficiently low will the force provided by voice coil 72 be capable of accomplishing movement of the slider to its second position and thus accomplish a valve state transition from high damping to low damping. The dimensions of control surfaces 62c and 62d may be selectively machined or configured to determine the desired preselected low magnitude of fluid pressure differential. In this manner, delay of damping state transition from high to low damping until the relative velocity between the supported and supporting members 12, 14 is at a preselected low magnitude is accomplished automatically without electronic commands, and thus independently of the particular control policy being implemented.

When the motion condition of the system just described changes such that the relative velocity between supported and supporting members 12, 14 is negative, i.e., when the damper stops extending and starts moving in compression, fluid flow within cylinder 30 will change direction and travel from the lower variable volume chamber 34' to upper chamber 34 in the manner shown in FIG. 5(b) by fluid flow lines 92. Provided that the sign of the absolute velocity of supported member 12 remains unchanged, a change in sign of relative velocity from extension to compression under the exemplified standard control policy will dictate that the damping force should be transitioned from the previous, restricted fluid flow high damping state of FIG. 5(a) to low damping in which fluid flow between the variable volume chambers is substantially permitted. Because of the reversible check valves, and in particular check valve 64b, low damping is automatically accomplished internal to valve means 22 without requiring the command and actuation of slider 62 from the first position to the second position. Fluid flow is permitted from main flow port 60b through intermediate flow port 62b of the slider and through check valve 64b. In this manner, the desired change in damping state is realized without relative velocity sensing and valve slider movement, thereby resulting in a greatly simplified, reliable operation accomplished by the check valve.

Figure 5D:
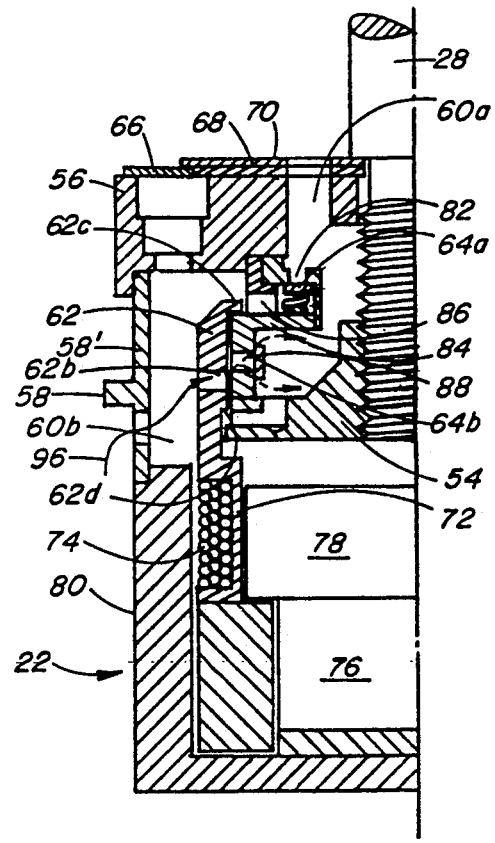

FIGS. 5(c) and 5(d) show valve slider 62 in its lower, second position. As seen in FIG. 5(c), system 10 is operating in extension such that fluid tends to flow from the upper variable volume chamber 34 to the lower chamber 34' in the manner schematically represented by flow lines 94. With valve slider 62 in the second position, a low damping state is selected since fluid flows relatively freely through passages 82, past check valve 64a, through passageway 86 and across the top of the slider for discharge out main flow port 60b. Upon relative velocity sign change, which occurs when the damper begins operating in compression, and whereupon fluid flow tends to be in the opposite (upward) direction (as indicated by lines 96), it is seen from FIG. 5(d) that the reversible check valves automatically produce a damping state transition from low damping to high damping without slider 62 movement from the second to the first position. Fluid flow is substantially restricted from travel through one-way check valve 64a, and likewise prevented to a substantial degree from passage through check valve 64b due to the illustrated vertical misalignment of slider intermediate flow ports 62b and passageway 88. A small amount of leakage through ports 62b may be provided as desired, for selecting and tuning the high damping coefficient for the particular application.

Automatic internal delay of damper switching from high to low is accomplished in the case shown in FIG. 5(d) because of the relatively high fluid pressure acting on the top portion of slider 62 and the corresponding relatively low fluid pressure acting on the lower control surface 62d, such that the net pressure force acting on slider 62 will hold the slider in the second position as long as the pressure force is greater than an oppositely directed commanded force provided by voice coil 72. In this manner, even if switching were commanded by control means 38, a delay in switching would occur to prevent the aforementioned force discontinuities and/or noise characteristic of switching from high damping to low damping at times when the relative velocity between supported and supporting members 12, 14 is relatively high. When the dynamic fluid pressure differential between chambers 34 and 34' reaches a preselected low magnitude, due to a reduction in the relative velocity across the damper, the slider may be electronically moved once again to its first position to effect a change in damping state to low damping. Note however, under the conditions shown in FIG. 5(c), the pressure differential will not prevent movement of slider 62 from the second position to the first position and therefore will not cause delay in switching from low damping to high damping.

Figure 6:
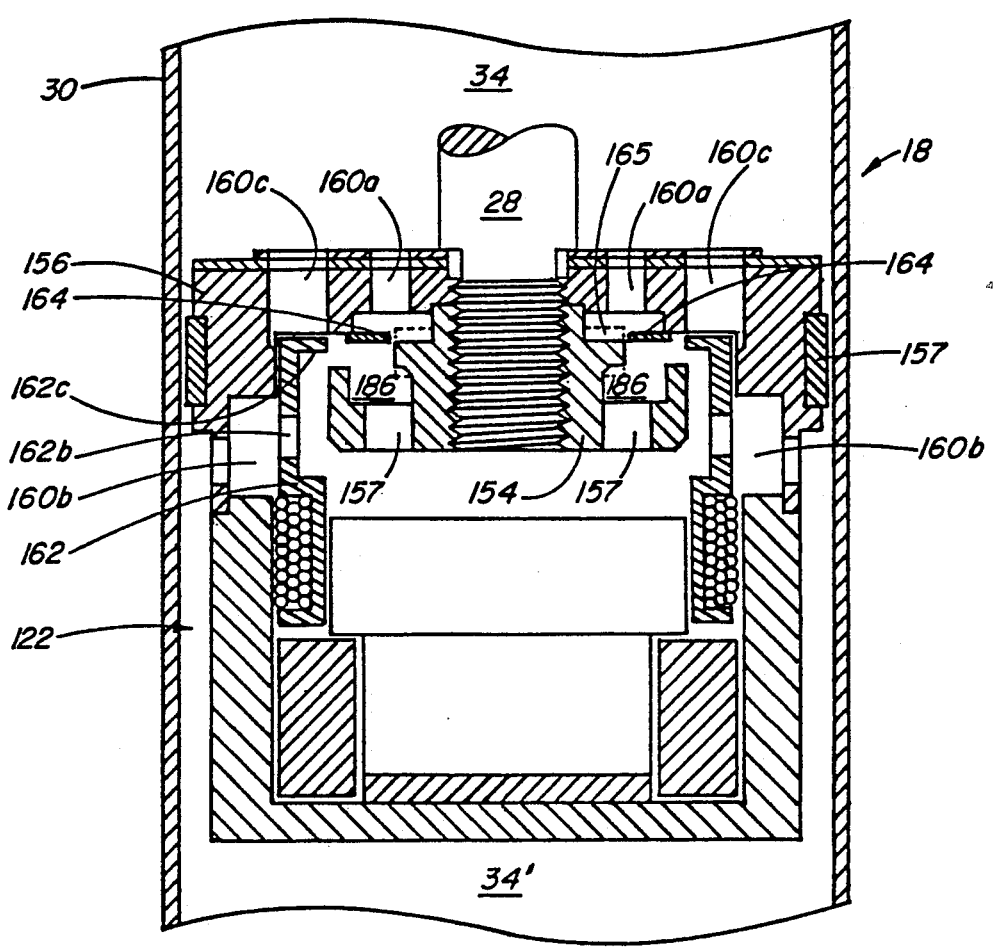
FIG. 6 is a fragmented, partially cross-sectional view of the damper means of the present invention showing another embodiment of the adjustable valve means having a single floating disc type check valve.

An alternative embodiment of the present invention is shown in FIGS. 6 and 7(a-d) which also efficiently provides automatic mechanical delay of damper state transition from high to low damping and internal, hydromechanical damping state transitions based on relative velocity sign changes as previously discussed. The modified valve means 122 is configured for improved dynamic fluid pressure interaction with moving components of the valve. A relatively large volume of fluid is capable of passing through core 154 and upper manifold 156 respectively through intermediate flow ports 157 and the plurality of main flow ports 160a and 160c. Communication of hydraulic fluid into the lower chamber 34' is provided through the radially spaced lower main flow ports 160b also positioned in upper mainfold 156. A resilient fluid seal 157 may be incorporated about the periphery of upper manifold 156. The slider 162 has an enlarged intermediate flow port 162b and a single, relatively large pressure or flow control surface 162c. For simplified operation of the reversible check valve function, a unitary check valve 164 of the floating disc type is provided for pressure dependent movement between an upper seat against upper manifold 56 and a lower seat against core 154. Low flow resistance and sensitive check valve movement is accomplished by orientation thereof within large area passageway 186. Pressure relief similar to that accomplished by pressure relief ring 66 in the first embodiment of the damper valve means is accomplished by the floating disc check valve 164. Under high fluid pressure conditions, check ring 164 flexes to permit passage of fluid between its inner radial edge and core 154. Check ring 164 is also stabilized from jamming in movement between its first and second position by a plurality of stabilizing tabs 165 associated with core 154. The stabilizing tabs help to maintain the perpendicular attitude of check ring 164 relative to the vertical axis of the piston.

Figure 7A:
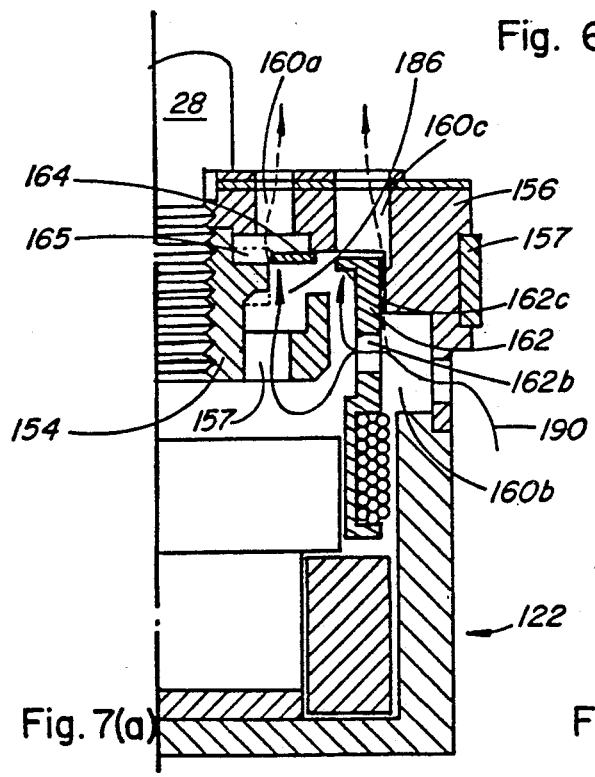
FIGS. 7a–7d are fragmented, somewhat schematic radial half-section views of the adjustable valve means of FIG. 6 showing the check valve and slider functions during compression and extension conditions of motion.
Figure 7B:
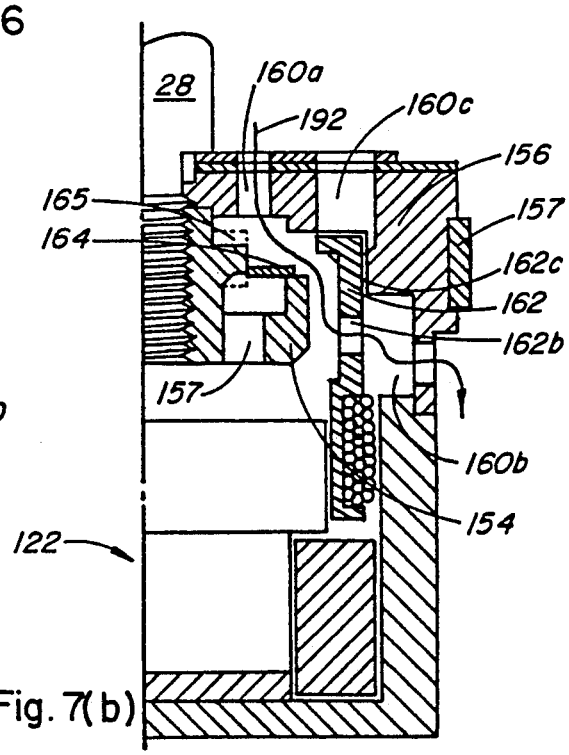
Figures 7C, 7D:
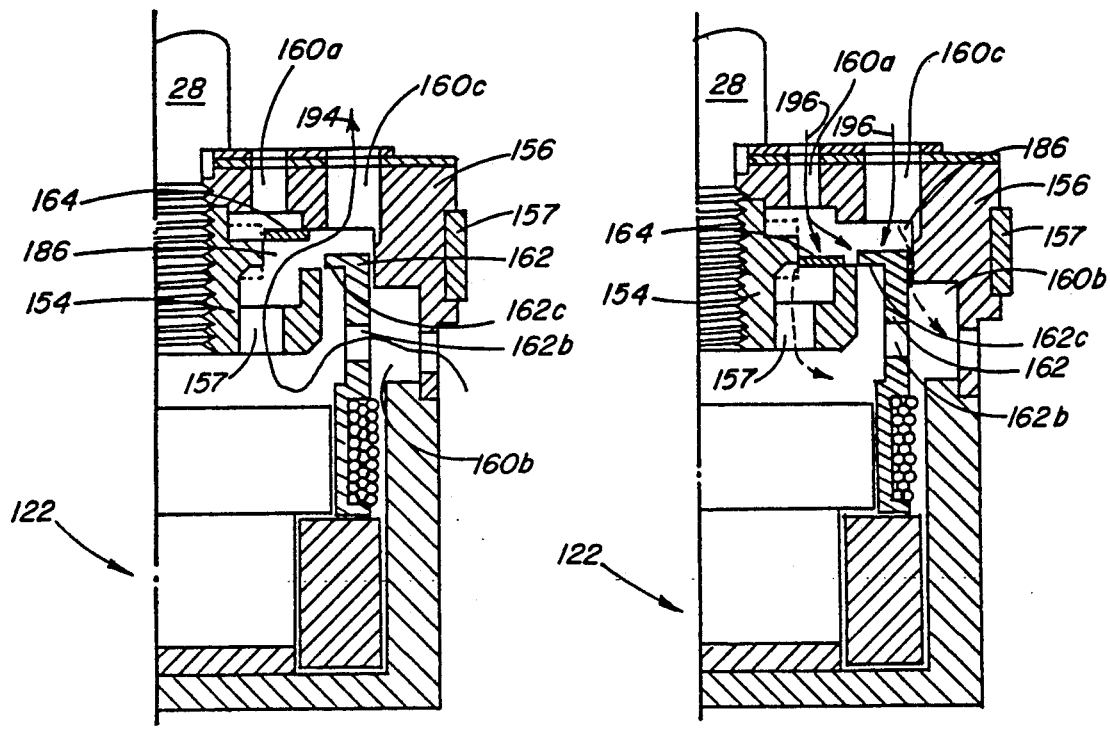

As can be seen with reference to FIGS. 7(a-d), a change in damping state based upon a sign change in relative velocity, e.g., a transition of the system between extension and compression, can be accomplished without external command from control means 38 and actuation of slider 162. When the slider is in the first position and the system is under compression (FIG. 7(a)), the dynamic fluid pressure moves or forces check ring 164 into its upper position, and the high damping state results. If the pressure differential exceeds a selected value, relief flow is provided due to check ring flexure (wherein its inner radial surface moves up, or deflects). Upon change in direction of relative velocity to extension (FIG. 7(b)), check ring 164 is forced by fluid pressure to its lower position against core 154. At such times, fluid is permitted to flow relatively freely past the check ring 164 through the slider intermediate flow port 162b for automatic selection of low damping. The transition from high damping to low damping as shown is accomplished without actuation and movement of slider 162 from its first to second position. As shown in FIG. 7(c) when slider 162 is in its second position during compression low damping is selected. Hydraulic fluid flows relatively freely through the slider intermediate flow port 162b, the intermediate core flow ports 157 and through main flow ports 160b. The dynamic fluid pressure forces the floating check valve 164 into its upper position. Upon change in sign of the relative velocity to extension, check ring 164 is pressure biased to its second position (FIG. 7(d)) to automatically select high damping.

Pressure forces impacting on slider control surface 162c function to automatically delay switching from high damping to low damping even when commanded to do so by control means 38 where the relative velocity is greater than a preselected magnitude. When slider 162 is in its first position during compression, as in FIG. 7(a), the dynamic fluid pressure (indicated schematically by lines 190) serves to bias slider control surface 162c and the slider upwardly. Only when the dynamic fluid pressure differential reaches a preselected low valve, may movement of slider 162 to its second position be accomplished. As seen with reference to FIG. 7(d), when operating under extension with valve slider 162 in the second position (high damping), transition to the low damping state is restricted by the dynamic pressure forces schematically illustrated by flow lines 196 impacting the top portion of slider control area 162c. Alternatively, if adjustable valve means 122 is operating in the low damping state when slider 162 is in either of its first or second positions, control means actuated transition from low damping to high damping is not restrained by the dynamic fluid pressure forces and no delay occurs.

Figure 8:
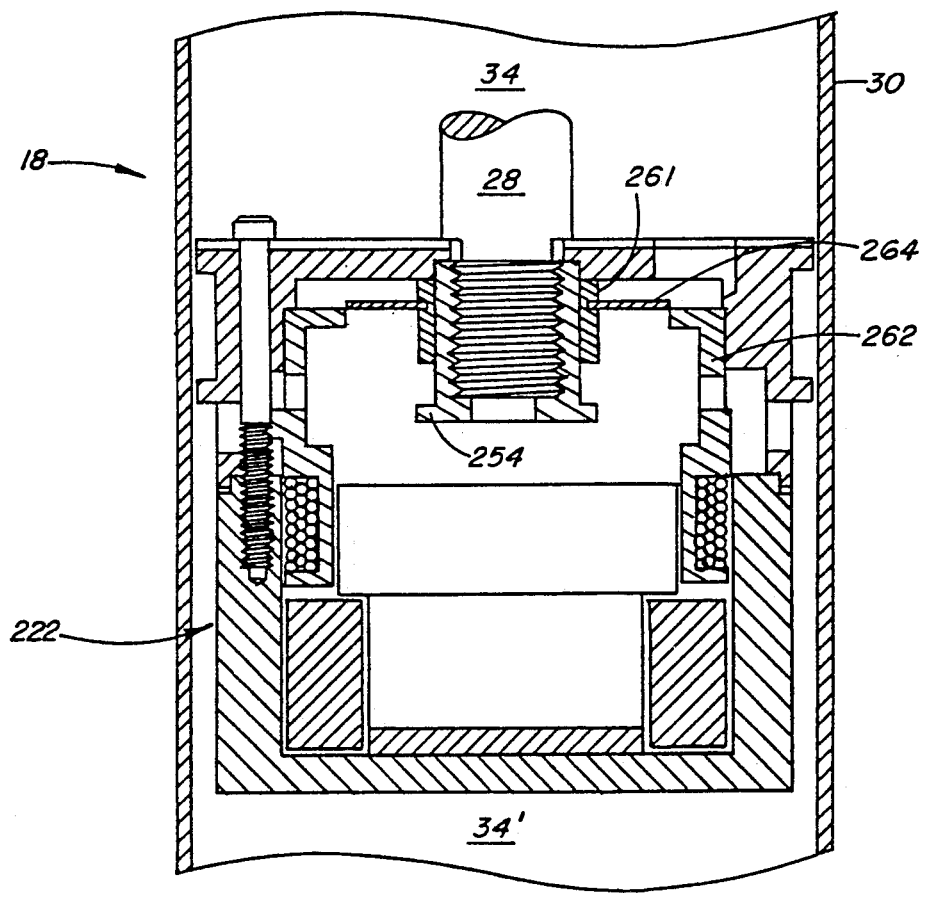
FIG. 8 is a fragmented, partially cross-sectional view of the damper means of the present invention showing yet another embodiment of the adjustable valve means.

In order to facilitate check valve transition between its upper and lower positions, another modified embodiment of the present invention may be provided as shown in FIG. 8. Valves means 222 of FIG. 8 includes an axially reciprocable cylindrical sleeve 261 positioned about a portion of inner core 254. Attached or configured in association with sleeve 261 is the reversible floating disc check valve 264. The escorted motion of check valve 264 in conjunction with the cylindrical sleeve 261 serves to maintain the orthogonal attitude of the check valve at all times to prevent misalignment and jamming. As configured, the floating check valve 264 and reciprocating valve slider 262 align during high damping (in compression as shown, and also in extension when the slider is down) to form a single close tolerance flow restricting surface. The relief valve function is provided therebetween by flexure (up in this case) of the outer radial surface of check valve 264. The augmented hydraulic fluid surface area available in proximity to these moving valve components provides for improved responsiveness and reliability in the function of adjustable valve means 222.

Figure 9:
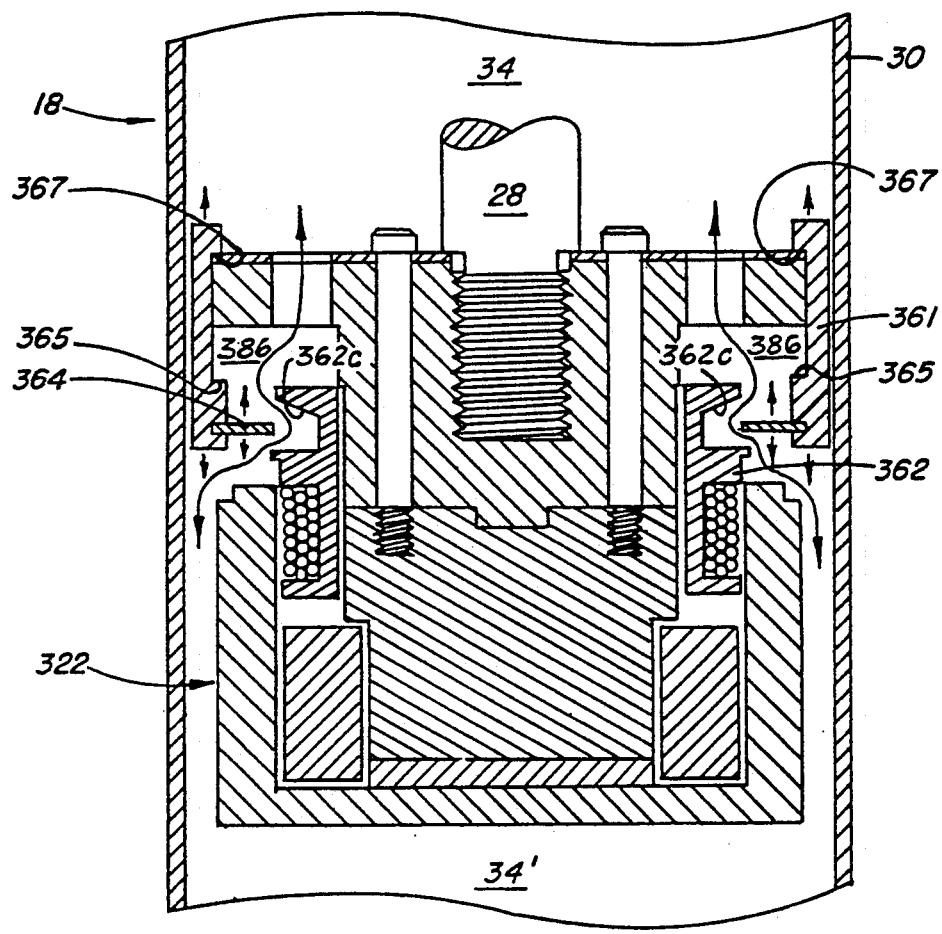
FIG. 9 is a fragmented, radial half-section view of the damper means of the present invention showing still another embodiment of the adjustable valve means.

A still further modified embodiment of the present invention may be provided as shown in FIG. 9. The adjustable valve means 322 provides for an even larger dynamic flow area between chambers 34 and 34' as shown by the somewhat enlarged area fluid passageways 386 within the piston. Similar to the other embodiments described, the valve slider 362 is movable vertically between upper and lower position and is actuated electronically. In order to restrict fluid flow through passageway 386 between chambers 34, 34', the top portion of slider 362 must align with the reversible check valve 364. The check valve 364 is retained within a cylindrical sleeve member 361 positioned about the periphery of the piston against the inner wall of cylinder 30. Dynamic fluid pressure forces impacting on check valve 364 within chamber 386 serve to move the check ring 364 and sleeve connected thereto along its vertical path of motion between upper and lower positions. As shown in FIG. 9, check valve 364 is in its lower position and is prevented from moving further downwardly by limit stops 367 of the sleeve 365, which are impacting on the top portion of the piston. Alternatively, when check valve 364 is in its most upwardly position, limit stops 365 engage with the upper manifold to prevent further movement in the upper direction. While dynamic fluid pressure forces impacting on check valve 364 substantially serve to impact movement thereto, the cylindrical sleeve member 361 likewise assists its movement by frictional interaction with cylinder wall 30. Thus, for example, when the piston is moving upwardly in extension, sleeve 361 will rub against cylinder wall 30 and assist its movement to the downward position as shown in FIG. 9. In addition to assisting movement of check valve 364, sleeve 361 also provides stability for check valve 364 in maintaining its perpendicular orientation relative to the axis of the piston.

As shown in FIG. 9, low damping is provided such that relatively free flow of fluid between chambers 34, 34' occurs when check valve 364 and the top portion of slider 362 are displaced vertically relative to one another. On the other hand, when check valve 364 and slider 362 are both in their most upwardly positions, the top surface of slider 362 and check valve 364 align vertically across passageway 386 to substantially obstruct fluid flow between chambers 34 and 34'. A similar alignment for high damping also occurs when both the check valve 364 and slider 362 are in their downward positions. When operating in the flow-restricted (and thus high damping) positions, fluid pressure relief for this system due to unusually harsh force impulses is provided by the compliant nature of check valve 364. When the fluid pressure differential across the piston is substantially high, valve means 364 will flex to permit leakage between its inner radial diameter and the outer radial diameter of the top portion of slider 362.

The operation of the embodiment shown in FIG. 9 is similar to the embodiments previously discussed wherein check valve 364 is movable by the dynamic fluid pressure forces of the system between the upper and lower positions to automatically provide for damper state transition between high damping and low damping upon change in sign of relative velocity, without the movement of slider 362. Slider 362 is also fluid pressure biased at control surfaces 362c such that damper state transition from high damping to low damping is automatically delayed, until the relative velocity across the damper is at a preselected low magnitude, in the manner previously discussed.

Figure 10:
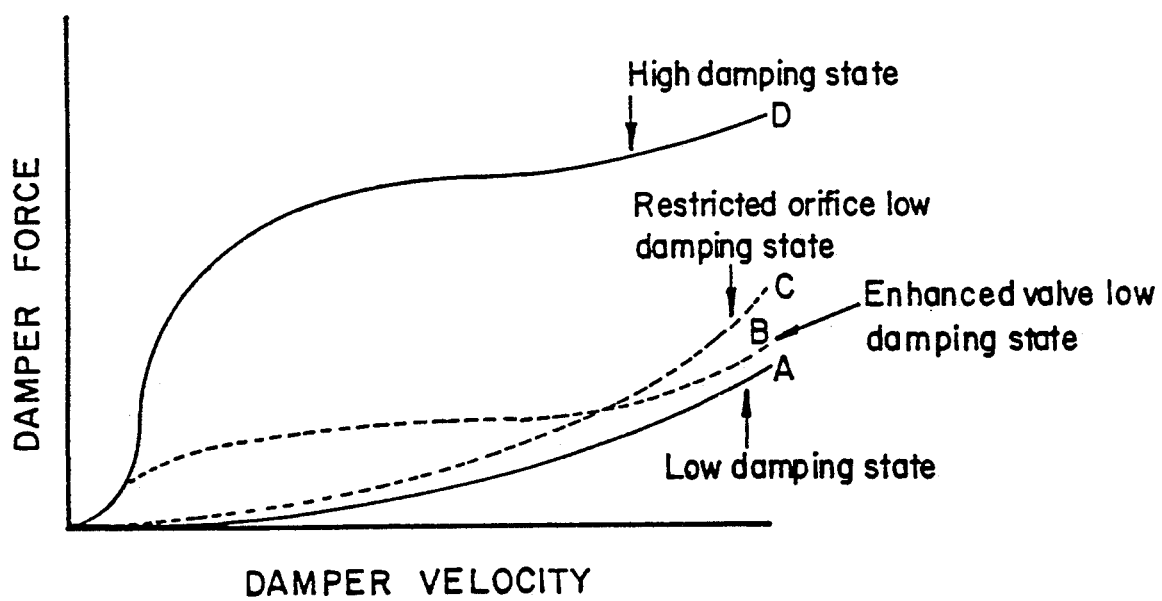
FIG. 10 is a graphical representation showing the relationship between damper force and damper velocity for high (or on state) damping and low (or off-state)

Embodiments of the present invention in addition to the features and advantages just described may also provide for selected fixed non-zero low state damping as shown with reference to FIG. 10 which is indeed beneficial in controlling "wheel hop" phenomena in a vehicle application. For example, when system 10 is operating with the valve means in low state damping, the fully open valve flow area through the valve means is fixed. As a result, the hydraulic fluid flow characteristics as described in the relationship between damper force and damper velocity will be of a square law nature as represented by curve (A) of FIG. 10. Compared with the on state (high damping) condition represented by Curve D, it is shown that even at damper velocities in excess of approximately 40 in./sec. a reasonable bandwidth, or ratio of "on" to "off" state damping is observed. However, if it is desired to increase the low state damping force at low damper velocities to solve the wheel hop problem by, for example, reducing the fluid flow orifice of the valve arrangement, the result is shown as represented by Curve C. In the relatively low damper velocity region, the low state damping force is not improved. In a middle region, with damper velocities greater than 5 in./sec. but less than approximately 15-20 in./sec., the low state damping force is somewhat improved, but not to a significant degree. Most importantly, however, this approach will degrade system performance in the region of damper velocities in excess of 30-50 in./sec. As shown for high damper velocities, the on (curve D) to off (curve C) state damping ratio or bandwidth will quickly narrow.

As an alternative to providing additional flow restriction as described, the approach of the present invention is to provide a preload in the low damping state by the check valve arrangement. The improved results are shown as represented by Curve B. In the region of low damper velocities, a significant increase in damper force occurs which is sufficient to minimize and even eliminate the wheel hop problem. Likewise, in the middle and high damper velocity regions, the switching bandwidth or ratio of on to off state damping is maintained since the slope of the high and low damping curves, D and B respectively, are approximately the same. The result is significantly improved damper performance at all damper velocities.

While preferred embodiments of the present invention have been described in detail, they are used in a generic and descriptive sense only and not for purposes of limitation; various modifications, alterations and changes may be made without departing from the spirit and scope of the present invention as defined in the appended claims.

What is claimed is:

1. Semi-active damper means, comprising:
a hydraulic damper assembly switchable between high and low damping states wherein the damping coefficient of said damper assembly is respectively relatively high and relatively low, said damper assembly having relatively movable members defining a pair of interconnected chambers containing hydraulic fluid, relative movement in compression and extension of said movable members creating a fluid pressure differential and causing flow of said fluid between said chambers;

valve means for regulating said flow of fluid between said interconnected chambers, said valve means being operable between first and second conditions, wherein in said first condition said fluid flow is restricted to a relatively greater extent such that said damping coefficient of said damper assembly is relatively high, and wherein in said second condition said fluid flow is restricted to a relatively lesser extent such that said damping coefficient of said damper assembly is relatively low;

valve drive means movable between first and second positions for when actuated imparting forces to said valve means tending to cause transition thereof between said first and second conditions, said valve means also being subject to biasing forces by said fluid pressure differential such that transition from said first condition to said second condition is automatically deferred until said biasing forces are at a preselected low magnitude;

relative velocity switching means for automatically switching said damper assembly from one to the other of said damping states, without transition of said valve drive means from one to the other of said first and second positions, upon transition of said damper assembly between compression and extension and extension and compression of said movable members.

2. The semi-active damper means as in claim 1, and further including control means for effecting actuation of said valve drive means in accordance with the dictates of a control policy based in part upon the relative velocity between said relatively movable members of said assembly.

3. The semi-active damper means according to claim 1 further comprising:
a slider member operably connected to said drive means and forming at least a part of said valve means for at times substantially obstructing fluid flow between said chambers and at times substantially permitting fluid flow between said chambers;
said slider member including at least one control surface wherein said fluid pressure differential at times acting on said control surface produces said biasing forces for deferral of said transition from said first condition to said second condition of said valve means.

4. The semi-active damper means according to claim 3 wherein said slider member further includes at least one opening therein for at times permitting fluid flow therethrough between said chambers.

5. The semi-active damper means according to claim 4 wherein:
said at least one control surface includes an upper control surface and lower control surface, said lower control surface being in communication with one of said chambers to at times provide in conjunction with said upper control surface fluid pressure assisted slider movement in the direction of valve means actuation.

6. The semi-active damper means according to claim 3 wherein:

said at least one control surface at times further provides for fluid pressure assisted slider movement in the direction of drive means actuation from said second position to said first position.

7. The semi-active damper means according to claim 1 wherein said relative velocity switching means comprises:
check valve means for at times substantially obstructing fluid flow between said chambers and at times substantially permitting fluid flow between said chambers;
said check valve means being fluid pressure actuated between compression and extension positions.

8. The semi-active damping assembly according to claim 7 wherein:
said check valve means includes first and second one-way check valves.

9. The semi-active damping assembly according to claim 8 wherein:
at least one of said one-way check valves are of the floating disc type.

10. The semi-active damping assembly according to claim 8 wherein:
at least one of said one way check valves are of the split ring type.

11. The semi-active damping assembly according to claim 7 wherein:
said check valve means includes a check ring member.

12. The semi-active damping assembly according to claim 11, and further including a sleeve assembly supporting said check ring member for movement between compression and extension positions.

13. The semi-active damper assembly according to claim 12 wherein one of said relatively movable members of said damper assembly includes cylinder means defining, with the other of said relatively movable members, said chambers; said sleeve assembly being positioned for surface contact with said cylinder means such that said relative movement in compression and extension of said movable members provides for assisted movement of said check ring member.

14. The semi-active damping assembly according to claim 11 wherein:
said check ring member in either of said compression and extension positions is sufficiently flexible to enable fluid flow around a peripheral edge thereof and hence provide for pressure relief of said fluid between said chambers at a preselected fluid pressure differential between said chambers.

15. Semi-active damping means for attenuating the transmission of energy between relatively movable members comprising:
a fluid-type damping assembly including cylinder means and a piston movable therein in extension and compression and disposed between opposing fluid chambers, said damping assembly interconnecting said movable members and being operable between high damping and low damping states in which the damping coefficient thereof is respectively relative high and relatively low, relatively movement between said relatively movable members creating a pressure differential between said opposing fluid chambers of said damping assembly;
control means for switching said damping assembly from one to the other of its states dependent at least in part upon the sign of the relative velocity between said movable members;
means defining fluid passages through said piston for communication of fluid between said opposing fluid chambers during compression and extension of said damping assembly;
check valve means associated with said fluid passages for at times restricting fluid flow therethrough and at other times permitting relatively free fluid flow therethrough, said check valve means being movable automatically in response to changes in the condition of the damping assembly between extension and compression;
valve slider means switchable between first and second positions responsive to said control means such that in said first position said valve slider means during extension permits fluid flow through said passages to select low damping and during compression obstructs fluid flow through said passages along with said check valve means to select high damping, and in said second position said valve slider means during compression permits fluid flow through said passages to select low damping and during extension obstructs fluid flow along with said check valve means to select high damping;
said valve slider means being subject to fluid pressure biasing forces generated by said pressure differential between said opposing fluid chambers of said damping assembly such that upon command by said control means to switch from high damping to low damping, switching of said slider means from one of said first and second positions and high damping to the other of said first and second positions and low damping is deferred until the fluid pressure differential between said opposing fluid chambers is at a preselected low magnitude.

16. The semi-active damping means according to claim 15 wherein:
said slider means includes fluid pressure control surface means upon which said fluid pressure differential acts to provide said biasing forces.

17. The semi-active damping assembly according to claim 15 wherein said means defining fluid passages includes:
at least one first fluid passages having a first one of said check valve means for substantially permitting fluid flow therethrough during compression and substantially preventing fluid flow therethrough during extension when said valve slider means is in said first position; and,
at least one second fluid passages having a second one of said check valve means for substantially permitting fluid flow therethrough during extension and substantially preventing fluid flow therethrough during compression when said valve slider means is in said second position.

18. The semi-active damping means according to claim 15 wherein:
said check valve means comprises a single movable disk member cooperable with said slider means to provide a close tolerance fluid obstructing region during said high damping state.

19. The semi-active damping means according to claim 18 wherein:
said disk member is compliant to provide pressure relief at a preselected high fluid pressure.

20. A semi-active damping assembly for attenuating the transmission of energy between relatively movable members, said damping assembly interconnecting said movable members and being operable between high damping and low damping states in which the damping coefficient thereof is respectively relatively high and relatively low, relative movement between said relatively movable members creating a pressure differential between said opposing fluid chambers of said damping assembly, the damping assembly comprising:

a control means for switching said damping assembly from one to the other of its damping states dependent at least in part upon the sign of the relative velocity between the movable members;

extension flow passages having one-way check valve means;

compression flow passages having one-way check valve means;

voice coil actuated slider means having an annular top portion and central porting means axially reciprocable by said control means between first and second positions;

wherein in said first position of said voice coil actuated slider means, during extension said annular top portion obstructs fluid flow through said extension flow passages to produce relatively high damping, and during compression flow is permitted through said central porting means and said compression flow passages to produce relatively low damping;

and, wherein in said second position of said voice coil actuated slider means, during extension fluid flow is permitted through said extension flow passages to produce relatively low damping and during compression said central porting means are misaligned with and flow is obstructed through said compression flow passages to produce relatively high damping;

said slider means being subject to fluid pressure biasing forces at pressure bearing surfaces thereof to delay switching of said slider from either of said first or second positions to the other of said first or second positions from said high damping state to said low damping state until the fluid pressure differential between said chambers is at a preselected low magnitude.

21. The semi-active damping assembly according to claim 20 wherein:

said pressure bearing surfaces include a first control area associated with said annular top portion of said slider and a second control area associated with a lower portion of said slider, said pressure bearing surfaces at times further imparting force to said slider in the direction of slider motion to assist switching thereof.

22. The semi-active damping assembly according to claim 20 wherein:

said one-way check valve means of said compression flow passages provide for a preload pressure drop in the low damping state for providing a variable or selectable low state damper force at relatively low damper velocities.

23. A method of attenuating the transmission of forces between relatively movable members in a semi-active damper means, comprising the steps of:

providing a hydraulic damper assembly between said relatively movable members operable between high damping and low damping states in which the damping coefficient thereof is respectively relatively high and relatively low;

providing control means for selecting one or the other of said damping states in accordance with a control policy dependent at least in part upon the sign of the relative velocity between said movable members;

providing control valve means movable between first and second positions for changing the damping states of the damper assembly;

providing actuator means responsive to the control means for imparting to the valve means driving forces tending to move the control valve means from one to the other of its positions and thereby tending to switch the damper assembly from one to the other of said damping states;

subjecting the control valve means to biasing forces generated by the pressure differential created across the damper assembly as a result of relative movement between the relatively movable members, movement of the control valve means by the drive means to a position effecting change of the damping state of the hydraulic damper assembly from high damping to low damping being automatically delayed by the biasing forces until the relative velocity of the relatively movable members is at a preselected low magnitude; and providing check valve means operable in response to the fluid pressure differential for automatically switching the hydraulic damper assembly between the damping states upon change in sign of the relative velocity between the movable members.

24. The method according to claim 23 and further including the step of providing a preload pressure drop across the damper assembly in its low damping state for providing a selectable low state damper force at relatively low damper velocities.

* * * * *